(12) United States Patent
Biset et al.

(10) Patent No.: US 10,316,755 B2
(45) Date of Patent: Jun. 11, 2019

(54) ACOUSTIC PANEL WITH SIDEWALL STRINGERS

(71) Applicant: Rohr, Inc., Chula Vista, CA (US)

(72) Inventors: Charles Michael Biset, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 84 days.

(21) Appl. No.: 15/356,053

(22) Filed: Nov. 18, 2016

(65) Prior Publication Data

US 2018/0142622 A1 May 24, 2018

(51) Int. Cl.

| | | |
|---|---|---|
| *F02C 7/045* | (2006.01) | |
| *F02C 7/24* | (2006.01) | |
| *G10K 11/168* | (2006.01) | |
| *G10K 11/16* | (2006.01) | |
| *F02K 1/82* | (2006.01) | |
| *G10K 11/172* | (2006.01) | |
| *F02C 7/00* | (2006.01) | |

(52) U.S. Cl.
CPC .............. *F02C 7/24* (2013.01); *F02K 1/827* (2013.01); *G10K 11/16* (2013.01); *G10K 11/168* (2013.01); *G10K 11/172* (2013.01)

(58) Field of Classification Search
CPC . F02C 7/045; F02C 7/24; F02K 1/827; G10K 11/168; G10K 11/172; B32B 3/12
See application file for complete search history.

(56) References Cited

U.S. PATENT DOCUMENTS

| | | | | |
|---|---|---|---|---|
| 2,333,343 A | * | 11/1943 | Tadeusz | B21D 53/00 156/197 |
| 3,341,395 A | * | 9/1967 | Weber | E04C 2/3405 428/134 |
| 3,380,206 A | * | 4/1968 | Barnett | E04B 9/001 181/292 |
| 3,734,234 A | * | 5/1973 | Wirt | E04B 1/86 181/286 |

(Continued)

FOREIGN PATENT DOCUMENTS

| | | | | |
|---|---|---|---|---|
| FR | 2396868 A1 | * | 2/1979 | ............. F02K 1/827 |
| GB | 1406844 A | * | 9/1975 | ................ F02C 7/24 |
| RU | 2064691 C1 | | 7/1996 | |

OTHER PUBLICATIONS

EP search report for EP17202636.1 dated Apr. 3, 2018.

*Primary Examiner* — Edgardo San Martin
(74) *Attorney, Agent, or Firm* — O'Shea Getz P.C.

(57) ABSTRACT

A panel for attenuating noise includes a porous first skin, a second skin, and a core connected between the porous first skin and the second skin. The core includes a corrugated body and a stringer body. The corrugated body includes a plurality of corrugations configured from at least a plurality of baffles and a plurality of porous septums. Each of the corrugations includes a respective one of the baffles and a respective one of the porous septums. A first of the corrugations forms a first channel that extends laterally between and longitudinally along a first of the baffles and a first of the porous septums. The stringer body includes a plurality of sidewalls arranged longitudinally along the first channel. Each of the sidewalls is disposed within the first channel and configured to fluidly isolate longitudinally adjacent portions of the first channel from one another.

18 Claims, 14 Drawing Sheets

(56) References Cited

U.S. PATENT DOCUMENTS

| | | | | |
|---|---|---|---|---|
| 3,831,710 | A * | 8/1974 | Wirt | G10K 11/172 |
| | | | | 181/286 |
| 3,848,697 | A * | 11/1974 | Jannot | F02K 1/827 |
| | | | | 181/220 |
| 3,913,702 | A * | 10/1975 | Wirt | B64D 33/06 |
| | | | | 181/286 |
| 3,963,094 | A | 6/1976 | Nowikas | |
| 4,231,447 | A | 11/1980 | Chapman | |
| 4,298,090 | A * | 11/1981 | Chapman | F02C 7/24 |
| | | | | 181/286 |
| 4,333,598 | A | 6/1982 | Ittner et al. | |
| 4,643,933 | A * | 2/1987 | Picken | B32B 3/12 |
| | | | | 428/116 |
| 5,487,930 | A * | 1/1996 | Lockshaw | B32B 3/12 |
| | | | | 428/53 |
| 5,635,306 | A * | 6/1997 | Minamida | B21D 47/00 |
| | | | | 228/181 |
| 6,274,216 | B1 | 8/2001 | Gonidec et al. | |
| 6,536,556 | B2 * | 3/2003 | Porte | B32B 3/12 |
| | | | | 181/284 |
| 6,544,623 | B1 | 4/2003 | Straza | |
| 6,725,541 | B1 * | 4/2004 | Holme | F02K 1/54 |
| | | | | 29/889.2 |
| 7,051,489 | B1 * | 5/2006 | Swiszcz | E04B 9/0442 |
| | | | | 160/84.05 |
| 7,661,510 | B2 * | 2/2010 | Muller | G10K 11/168 |
| | | | | 181/213 |
| 7,784,283 | B2 * | 8/2010 | Yu | F02K 1/04 |
| | | | | 181/213 |
| 7,824,775 | B2 * | 11/2010 | Copley | B23K 15/0006 |
| | | | | 219/121.14 |
| 8,628,635 | B2 * | 1/2014 | Chelin | B29C 70/30 |
| | | | | 156/219 |
| 9,127,452 | B1 | 9/2015 | Winfield et al. | |
| 9,303,588 | B2 | 4/2016 | Pongratz et al. | |
| 9,592,918 | B2 * | 3/2017 | Yu | B64D 33/06 |
| 9,704,467 | B1 * | 7/2017 | Nampy | G10K 11/172 |
| 9,761,216 | B2 * | 9/2017 | Nampy | G10K 11/172 |
| 2006/0112655 | A1 * | 6/2006 | Swiszcz | E04B 9/0442 |
| | | | | 52/222 |
| 2011/0244150 | A1 | 10/2011 | Thrash et al. | |
| 2017/0301334 | A1 * | 10/2017 | Nampy | F02C 7/24 |

* cited by examiner

ACOUSTIC PANEL WITH SIDEWALL STRINGERS

BACKGROUND OF THE INVENTION

1. Technical Field

This disclosure relates generally to noise attenuation and, more particularly, to an acoustic panel (sometimes also referred to as "an acoustic liner") for attenuating noise generated by, for example, a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers to attenuate higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints (e.g., loft envelope) for those engines, however, typically limit or prohibit increasing the thickness of an acoustic panel to tune its resonating chambers for such relatively low frequency noise. There is a need in the art therefore for an acoustic panel operable to attenuate relatively low frequency noise while utilizing the same or less space than previous acoustic panels. There is a further need to provide a panel configuration capable of reducing panel assembly time, complexity and cost.

SUMMARY OF THE DISCLOSURE

According to an aspect of the present disclosure, a panel is provided for attenuating noise. This panel includes a porous first skin, a second skin and a core connected between the porous first skin and the second skin. The core includes a corrugated body and a stringer body. The corrugated body includes a plurality of corrugations configured from at least a plurality of baffles and a plurality of porous septums. Each of the corrugations includes a respective one of the baffles and a respective one of the porous septums. A first of the corrugations forms a first channel that extends laterally between and longitudinally along a first of the baffles and a first of the porous septums. The stringer body includes a plurality of sidewalls arranged longitudinally along the first channel. Each of the sidewalls is disposed within the first channel and configured to fluidly isolate longitudinally adjacent portions of the first channel from one another.

According to another aspect of the present disclosure, another panel is provided for attenuating noise. This panel includes a porous first skin, a second skin and a core connected between the first skin and the second skin. The core includes a corrugated body and a stringer body. The corrugated body includes a plurality of corrugations configured from at least a plurality of baffles and a plurality of septums. Each of the septums is configured with a plurality of perforations. Each of the corrugations includes a respective one of the baffles and a respective one of the septums. A first of the corrugations is configured with a first channel that extends laterally between and longitudinally along a first of the baffles and a first of the septums. The stringer body includes a plurality of sidewalls arranged longitudinally along the first channel. Each of the sidewalls projects vertically into the first channel to a peak of the first of the corrugations. Each of the sidewalls extends laterally between the first of the baffles and the first of the septums.

The corrugated body may be configured from or otherwise include composite material. In addition or alternatively, the stringer body may be configured from or otherwise include metal.

A second channel may extend laterally between and longitudinally along the first of the septums and a second of the baffles. The core may further include a second stringer body that includes a plurality of second sidewalls arranged longitudinally along the second channel. Each of the second sidewalls may project vertically into the second channel to a peak between the first of the septums and the second of the baffles. Each of the second sidewalls may extend laterally between the first of the septums and the second of the baffles.

A second of the corrugations may form a second channel that extends laterally between and longitudinally along a second of the baffles and a second of the porous septums. The core may further include a second stringer body that includes a plurality of second sidewalls arranged longitudinally along the second channel. Each of the second sidewalls may be disposed within the second channel and configured to fluidly isolate longitudinally adjacent portions of the second channel from one another.

A second channel may extend laterally between and longitudinally along the first of the porous septums and a second of the baffles. The core may further include a second stringer body including a plurality of second sidewalls arranged longitudinally along the second channel. Each of the second sidewalls may be disposed within the second channel and configured to fluidly isolate longitudinally adjacent portions of the second channel from one another.

The first channel and the second channel may be on opposing sides of the corrugated body.

A cavity may extend laterally between the first of the baffles and the second of the baffles and may be fluidly coupled with perforations in the porous first skin. The first of the porous septums may extend from the porous first skin and the first of the baffles to the second skin and the first of the baffles, and divide the cavity into fluidly coupled first and second sub-cavities. The first sub-cavity may extend longitudinally between a longitudinally adjacent pair of the sidewalls. The second sub-cavity may extend longitudinally between a longitudinally adjacent pair of the second sidewalls.

A second of the corrugations may foil a second channel that extends laterally between and longitudinally along a second of the baffles and a second of the porous septums. The stringer body may further include a plurality of second sidewalls arranged longitudinally along the second channel. Each of the second sidewalls may be disposed within the second channel and configured to fluidly isolate longitudinally adjacent portions of the second channel from one another.

A first of the sidewalls may be configured as a single wall structure.

A first of the sidewalls may be configured as a multi-wall structure.

The first of the sidewalls may include a pair of sidewall panels and a bridge that may extend longitudinally between and connects the sidewall panels. Each of the sidewall panels may project into the first channel to the first of the baffles and the first of the porous septums from the bridge.

The stringer body may further include a tab that projects out from a first of the sidewalls and may be attached to the first of the baffles or the first of the porous septums.

Each of the sidewalls may extend laterally between the first of the baffles and the first of the porous septums. Each of the sidewalls may extend vertically to the porous first skin.

Each of the sidewalls may extend laterally between the first of the baffles and the first of the porous septums. Each of the sidewalls may extend vertically to the second skin.

The stringer body may further include a plurality of bridges arranged at an interface between the first of the baffles and the first of the porous septums. Each of the bridges may extend longitudinally between and connect a respective longitudinally adjacent pair of the sidewalls.

The stringer body may further include a base structure that interconnects the sidewalls together. Each of the sidewalls may project vertically into the first channel from the base structure.

The stringer body may be formed from sheet metal.

The stringer body may be configured from or otherwise include polymer.

The foregoing features and the operation of the invention will become more apparent in light of the following description and the accompanying drawings.

DETAILED DESCRIPTION OF THE INVENTION

Figure 1:
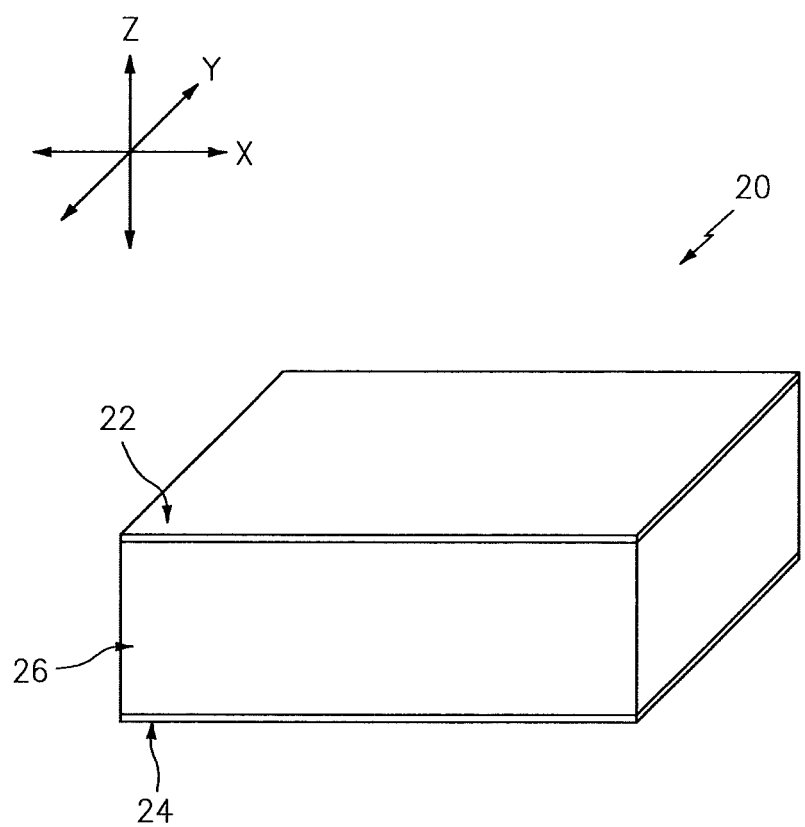
FIG. 1 is a partial, perspective block diagram illustration of a structural, acoustic panel for attenuating noise.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve of a thrust reverser, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

The acoustic panel 20 extends longitudinally along a y-axis. The acoustic panel 20 extends laterally along an x-axis. The acoustic panel 20 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical or conical with or without radial undulations. Thus, the vertical direction may change at different locations along the x-y plane; e.g., the vertical direction may be a radial direction for a cylindrical, conical or spherical acoustic panel.

The acoustic panel 20 includes an acoustic porous top skin 22 (e.g., a perforated face skin), a solid, non-perforated bottom skin 24 (e.g., a back skin) and a cellular core 26. Note, the terms "top" and "bottom" are used in this disclosure to describe the relative position of an element or a portion of an element as viewed in the figures. The present disclosure, however, is not limited to any particular gravitational orientation.

Briefly, the cellular core 26 is disposed and extends vertically between the top skin 22 and the bottom skin 24. The cellular core 26 is also connected to the top skin 22 and the bottom skin 24. The cellular core 26, for example, may be welded, brazed, fused, adhered and/or otherwise bonded to the top skin 22 and/or the bottom skin 24. The cellular core 26 may also or alternatively be mechanically fastened to the top skin 22 and/or the bottom skin 24. However, the present disclosure is not limited to any particular manufacturing methods.

Figure 2:
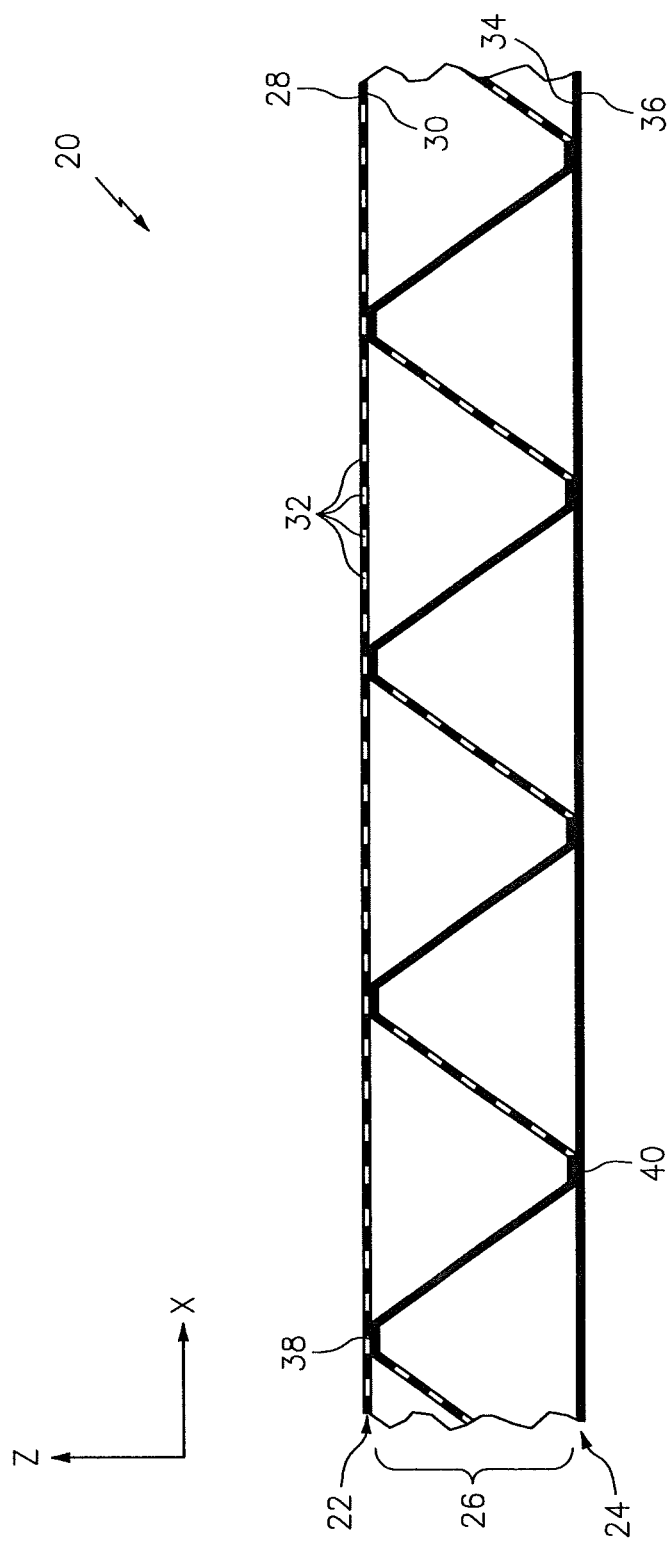
FIG. 2 is a sectional schematic illustration of a portion of the acoustic panel taken along line 2-2 in FIG. 3A.

The top skin 22 may be configured as a relatively thin sheet or layer of material that extends longitudinally and laterally along the x-y plane. This top skin 22 material may include, but is not limited to, a metal, a polymer, a fiber reinforced composite (e.g., fiberglass composite, carbon fiber composite, aramid fiber composite, etc.), or a combination thereof. Referring now to FIG. 2, the top skin 22 has a vertical thickness, which extends vertically between opposing first skin top and bottom surfaces 28 and 30. The top skin 22 includes a plurality of perforations 32; e.g., apertures such as through-holes. Each of these perforations 32 extends generally vertically through the top skin 22 between its surfaces 28 and 30. While the perforations 32 are described illustrated in FIG. 2 as through-holes, one or more of the perforations 32 may also or alternatively be formed by one or more interconnected pores in the top skin 22 material.

The bottom skin 24 may be configured as a relatively thin sheet or layer of solid, continuous and/or uninterrupted material that extends longitudinally and laterally along the x-y plane (see FIG. 1). This bottom skin 24 material may include, but is not limited to, a metal, a polymer, a fiber reinforced composite (e.g., fiberglass composite, carbon fiber composite, aramid fiber composite, etc.), or a combination thereof. The bottom skin 24 material may be the same as or different than the top skin 22 material. The bottom skin 24 has a vertical thickness, which extends vertically between opposing second skin top and bottom surfaces 34 and 36. This vertical thickness may be substantially equal to or different (e.g., greater or less) than the vertical thickness of the top skin 22.

Figure 3A:
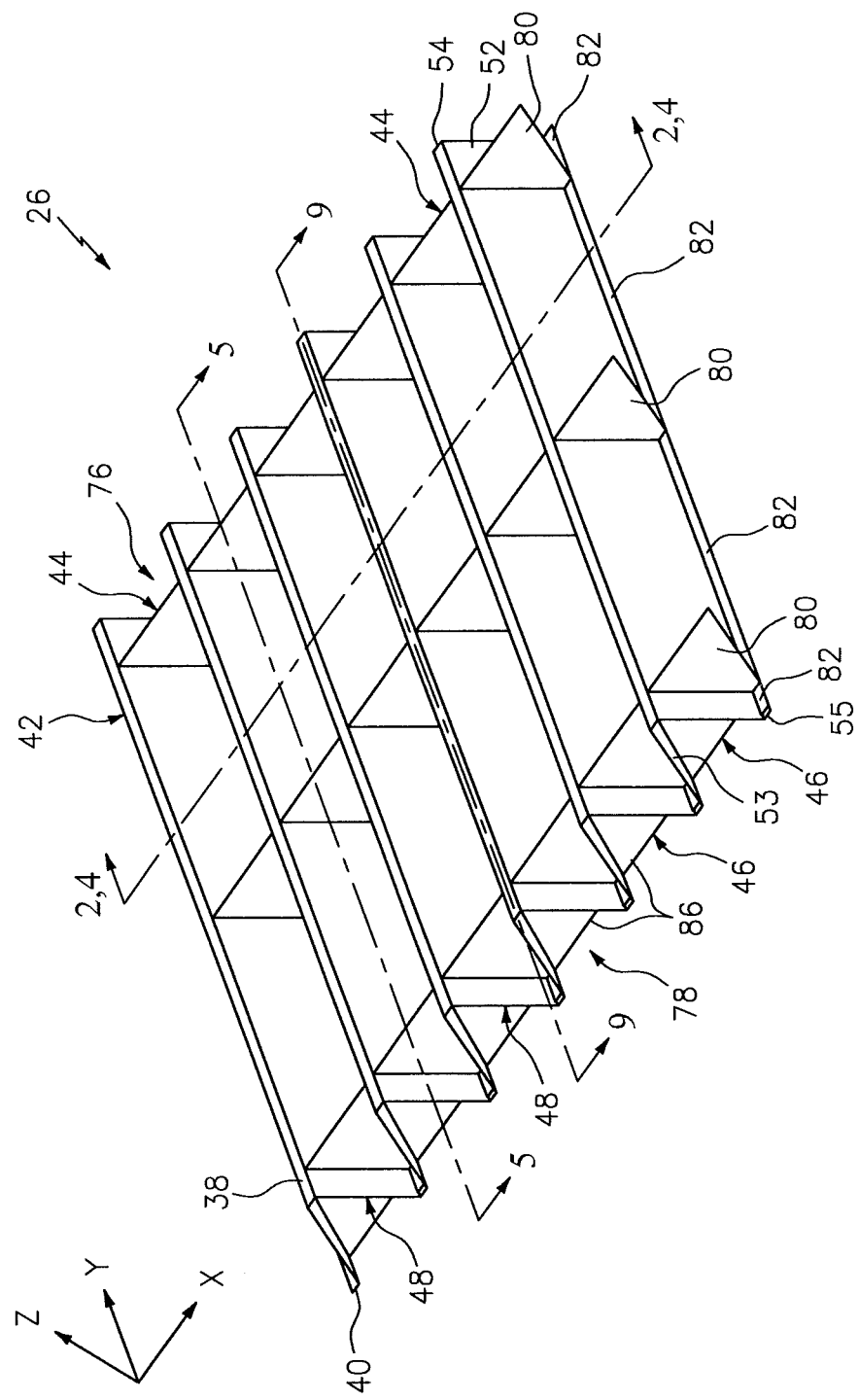
FIG. 3A is a perspective illustration of a portion of a cellular core for the acoustic panel.

Referring to FIG. 3A, the cellular core 26 extends longitudinally and laterally along the x-y plane. Referring again to FIG. 2, the cellular core 26 has a vertical thickness that extends vertically between opposing core sides 38 and 40 respectively abutted against the top skin 22 and the bottom skin 24. The vertical thickness may be significantly greater than the vertical thickness of the top skin 22 and/or the bottom skin 24. The vertical thickness of the cellular core 26, for example, may be at least ten to forty times (10-40×), or more, greater than the vertical thickness of the top skin 22 and/or the vertical thickness of the bottom skin 24; however, the acoustic panel 20 of the present disclosure is not limited to such an exemplary embodiment.

Figure 4:
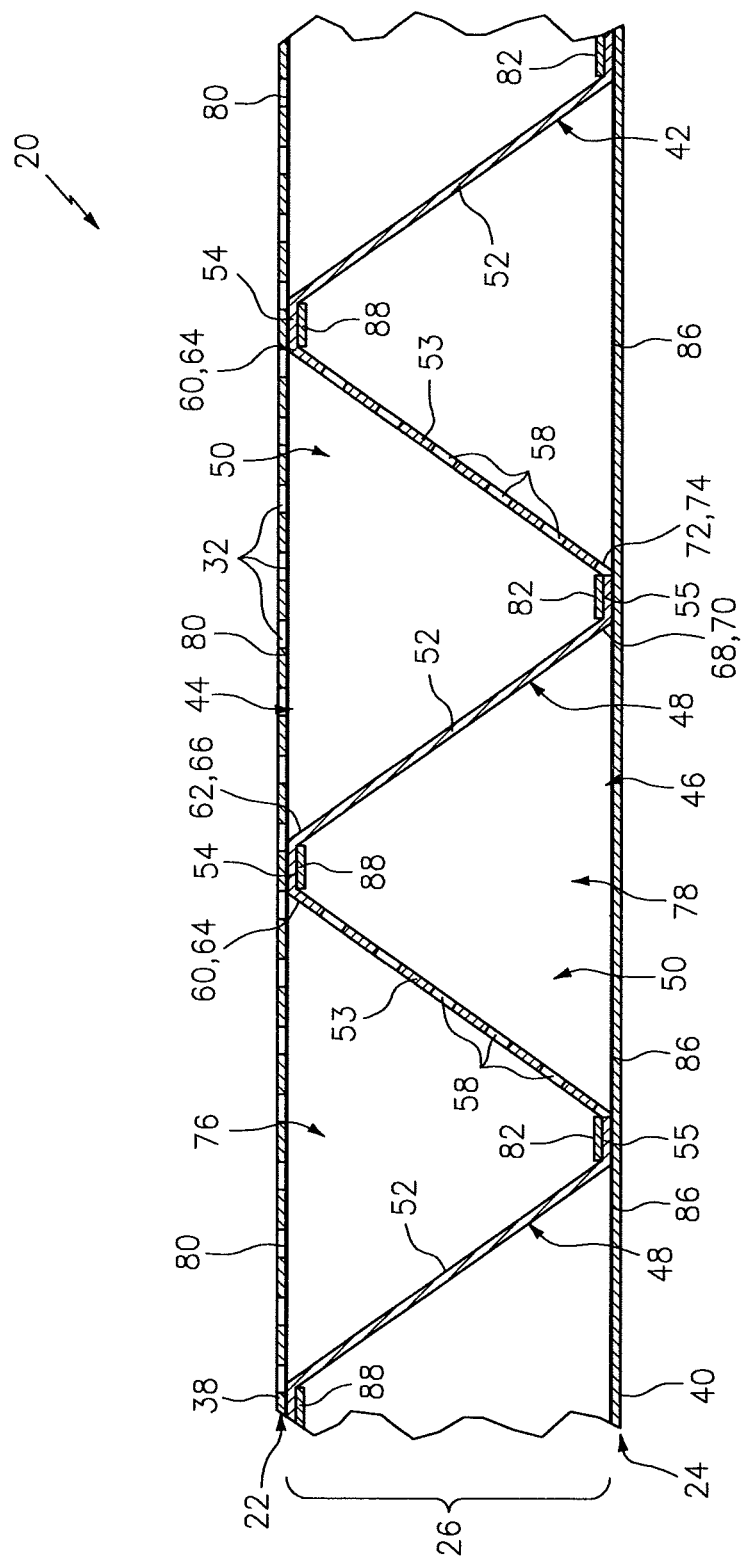
FIG. 4 is a sectional schematic illustration of a portion of the acoustic panel taken along the line 4-4 in FIG. 3A.
Figure 5:
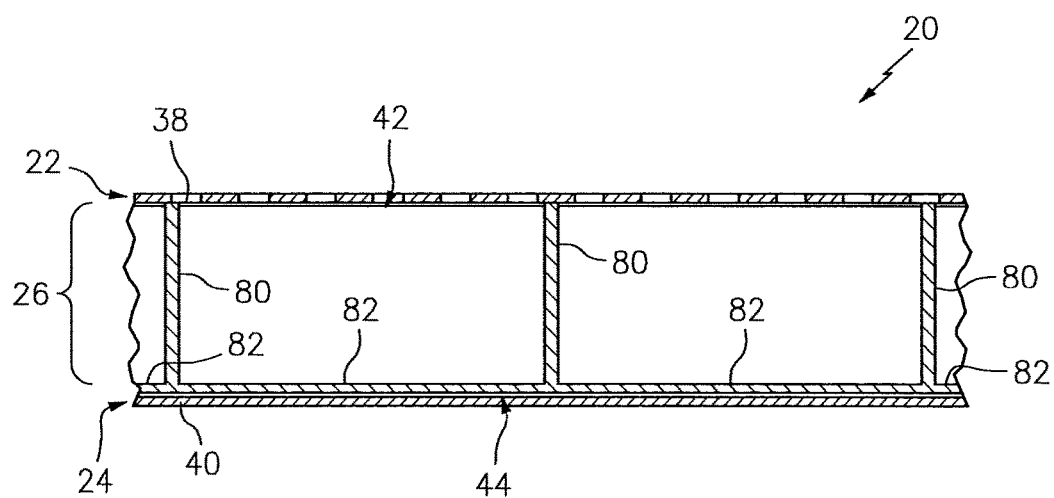
FIG. 5 is a sectional schematic illustration of another portion of the acoustic panel taken along line 5-5 in FIG. 3A.

Referring to FIGS. 3A, 4 and 5, the cellular core 26 includes a corrugated body 42, one or more top stringer bodies 44 and one or more bottom stringer bodies 46, where the top stringer bodies 44 and the bottom stringer bodies 46 are arranged on opposing sides of the corrugated body 42. More particularly, referring to FIGS. 4 and 5, the top stringer bodies 44 are disposed vertically between the corrugated body 42 and the top skin 22. The bottom stringer bodies 46 are disposed vertically between the corrugated body 42 and the bottom skin 24. Each of the bottom stringer bodies 46 is also aligned longitudinally with a respective one of the top stringer bodies 44 as seen in FIG. 3A.

Figure 6:
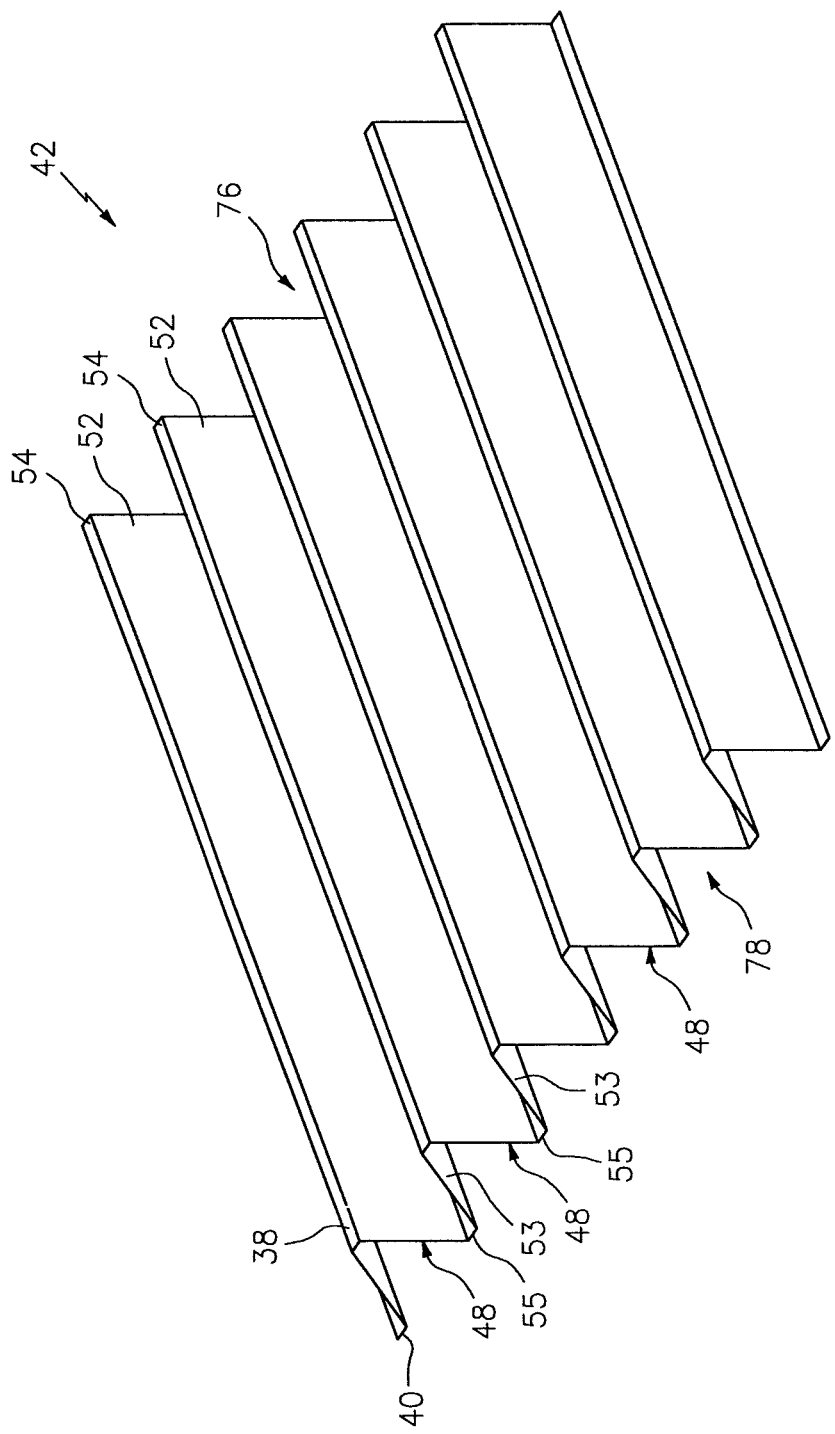
FIG. 6 is a perspective illustration of a corrugated body.

The corrugated body 42 of FIG. 4 includes a plurality of corrugations 48; see also FIG. 6. These corrugations 48 along with the top stringer bodies 44 and the bottom stringer bodies 46 are arranged together to configure the cellular core 26 as an open cavity structure; e.g., open cell structure. This open cavity structure forms a plurality of cavities 50 (see also FIG. 7) vertically between the top skin 22 and the bottom skin 24. Each of these cavities 50 may be fluidly coupled with one or more respective perforations 32 in the top skin 22 (see FIG. 4).

Referring to FIGS. 4 and 6, the corrugations 48 are arranged in a laterally extending array. This arrangement provides the corrugated body 42 with an accordion wall structure. More particularly, the corrugations 48 are configured from at least a plurality of baffles 52 and a plurality of porous septums 53; e.g., perforated septums. The corrugations 48 of FIGS. 4 and 6 are also configured from a plurality of top peak extensions 54 and/or a plurality of bottom peak extensions 55; however, in other embodiments, such extensions 54 and/or 55 may be omitted.

Each of the baffles 52 may be configured as a solid, continuous and/or uninterrupted panel of core material. Each of the septum 53 may be configured as a panel of core material with one or more perforations 58; e.g., apertures such as through-holes. While these perforations 58 are described and illustrated in FIG. 4 as through-holes for ease of description, one or more of the perforations 58 may also or alternatively be formed by one or more interconnected pores in the septum 53 material. Each of the top peak extensions 54 may be configured as a solid, continuous and/or uninterrupted panel of core material. Each of the bottom peak extensions 55 may be configured as a solid, continuous and/or uninterrupted panel of core material.

Each corrugation 48 includes a respective one of the baffles 52, a respective one of the septums 53, a respective one of the top peak extensions 54 and a respective one of the bottom peak extensions 55. Each of these corrugation portions 52-55 extends longitudinally along a longitudinal length of the respective corrugation 48 as shown in FIG. 6.

Referring to FIG. 4, the top peak extension 54 extends laterally from a distal first end 60 to a second end 62. The top peak extension 54 may also be attached (e.g., adhered and/or otherwise bonded to) to the top skin 22. The first end 60 may be connected to a top end 64 of a septum 53 in a laterally adjacent one of the corrugations 48. The second end 62 is connected to a top end 66 of the baffle 52. The baffle 52 extends laterally and/or vertically (e.g., diagonally) from its top end 66 to a bottom end 68, which is connected to a first end 70 of the bottom peak extension 55. The bottom peak extension 55 extends laterally from its first end 70 to a second end 72, which is connected to a bottom end 74 of the septum 53. The bottom peak extension 55 may also be attached (e.g., adhered and/or otherwise bonded to) to the bottom skin 24. The septum 53 extends laterally and/or vertically (e.g., diagonally) from its bottom end 74 to its top end 64, which may be connected toe first end 60 of the top peak extension 54 in a laterally adjacent one of the corrugations 48.

Referring to FIG. 6, each corrugation 48 forms a top channel 76 within the corrugated body 42. This top channel 76 extends laterally between the baffle 52 and the septum 53. The top channel 76 extends vertically into the corrugated body 42 from the core side 38 to the bottom peak extension 55. The top channel 76 also extends longitudinally along the entire longitudinal length of the corrugation 48.

Each laterally adjacent pair of the corrugations 48 also form a bottom channel 78 within the corrugated body 42. The bottom channel 78 extends laterally between the septum 53 of a first of the adjacent corrugations 48 to the baffle 52 of a second of the adjacent corrugations 48. The bottom channel 78 extends vertically into the corrugated body 42 from the core side 40 to the top peak extension 54 of the second of the adjacent corrugations 48. The bottom channel 78 also extends longitudinally along the entire longitudinal lengths of the adjacent corrugations 48. The top channels 76 and the bottom channels 78 are positioned on opposing sides of the corrugated body 42.

Figure 3B:
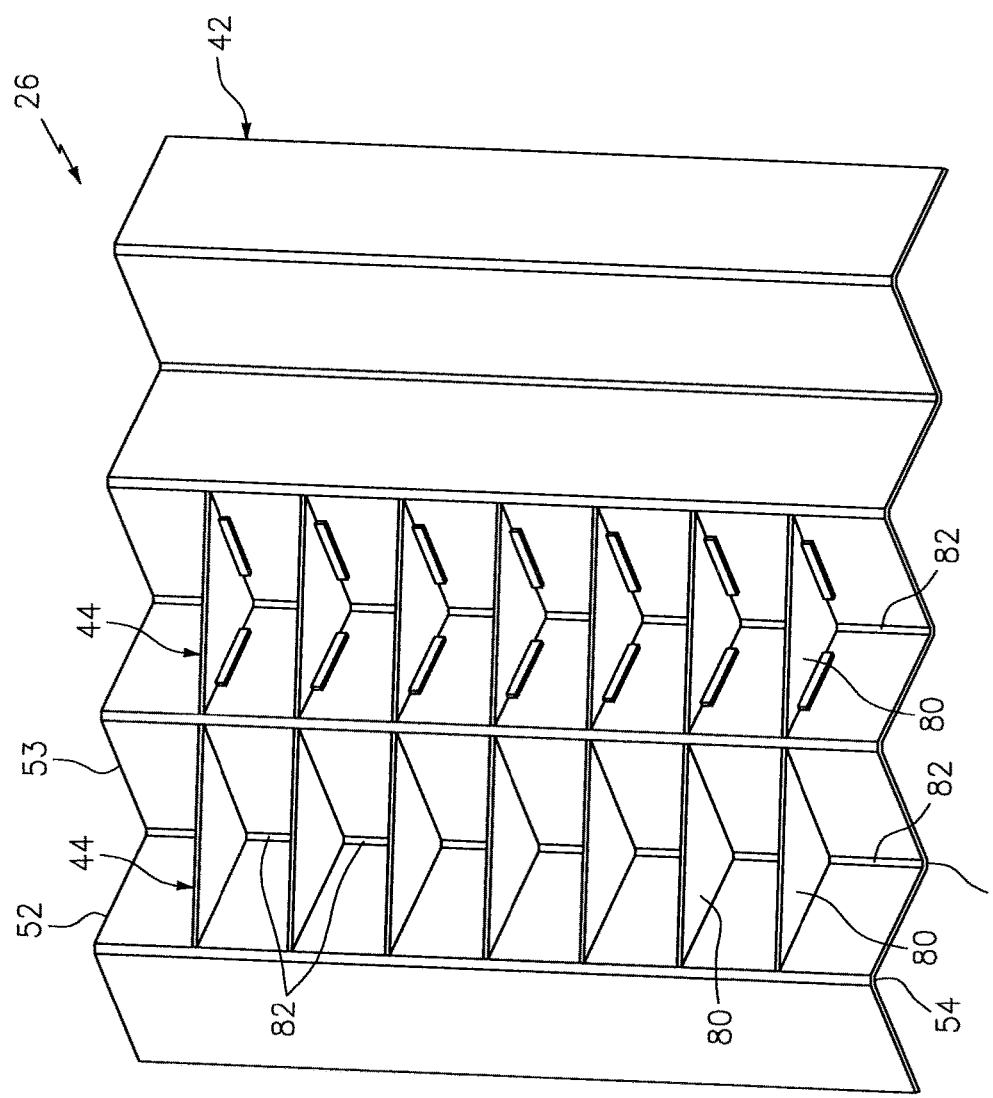
FIG. 3B is a perspective illustration of a portion of another cellular core with two different configurations of stringers.

Referring to FIG. 3A (see also FIG. 3B), each of the top stringer bodies 44 is arranged with a respective one of the top channels 76 and a respective one of the corrugations 48. Referring to FIGS. 3A and 5, each top stringer body 44 extends longitudinally along and within the respective top channel 76. Each top stringer body 44, for example, includes a plurality of top sidewalls 80 arranged in a longitudinally extending array. Each top stringer body 44 also include one or more top inter-sidewall bridges 82; see also FIG. 8.

Figure 8:
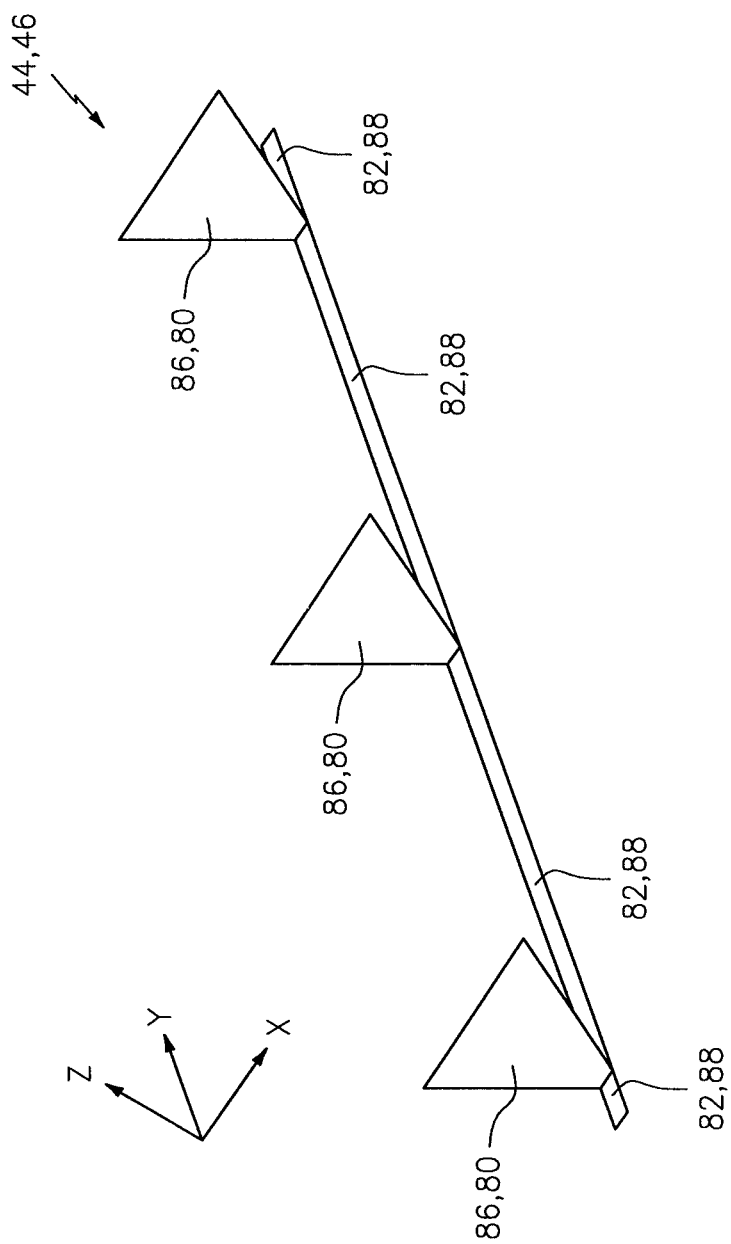
FIG. 8 is a perspective schematic illustration of a stringer body.

Referring to FIGS. 3A, 5 and 8, each of the top inter-sidewall bridges 82 extends laterally between a respective longitudinally adjacent pair of the top sidewalls 80. More particularly, each inter-sidewall bridge 82 is connected to bottom ends (e.g., peaks) of the adjacent top sidewalls 80. With this arrangement, each inter-sidewall bridge 82 extends along and is adjacent to an interface (e.g., the bottom peak extension 55) between the baffle 52 and the septum 53 of a respective corrugation 48. This inter-sidewall bridge 82 may also be attached to (e.g., adhered and/or otherwise bonded to) the bottom peak extension 55.

Figure 9A:
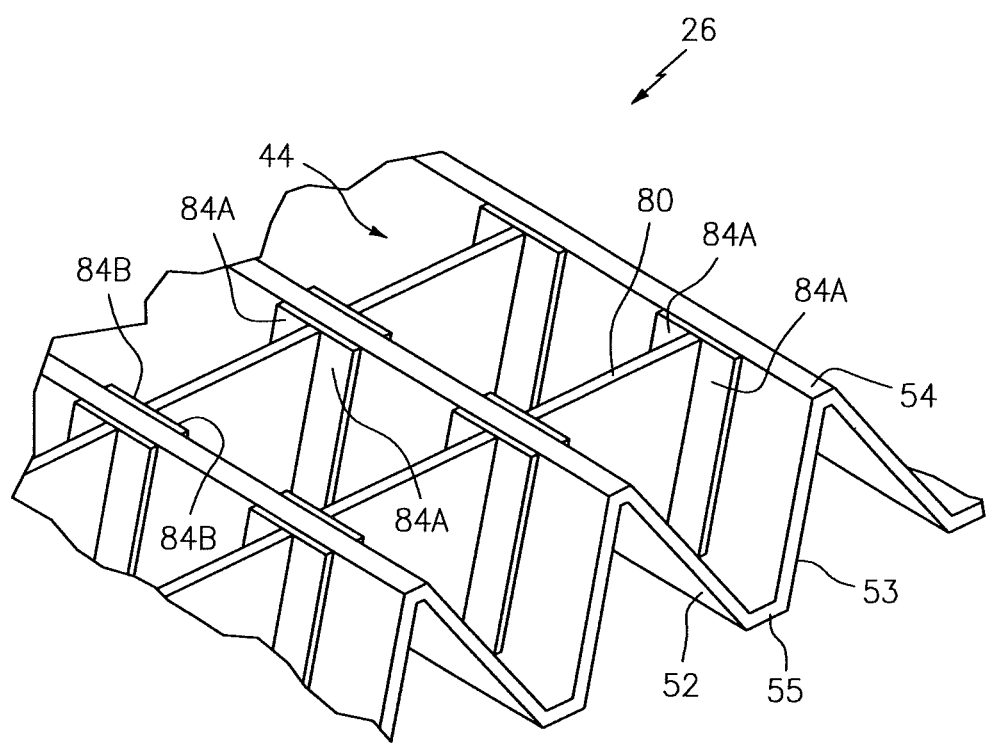
FIG. 9A is a perspective illustration of another cellular core for the acoustic panel.
Figure 9B:
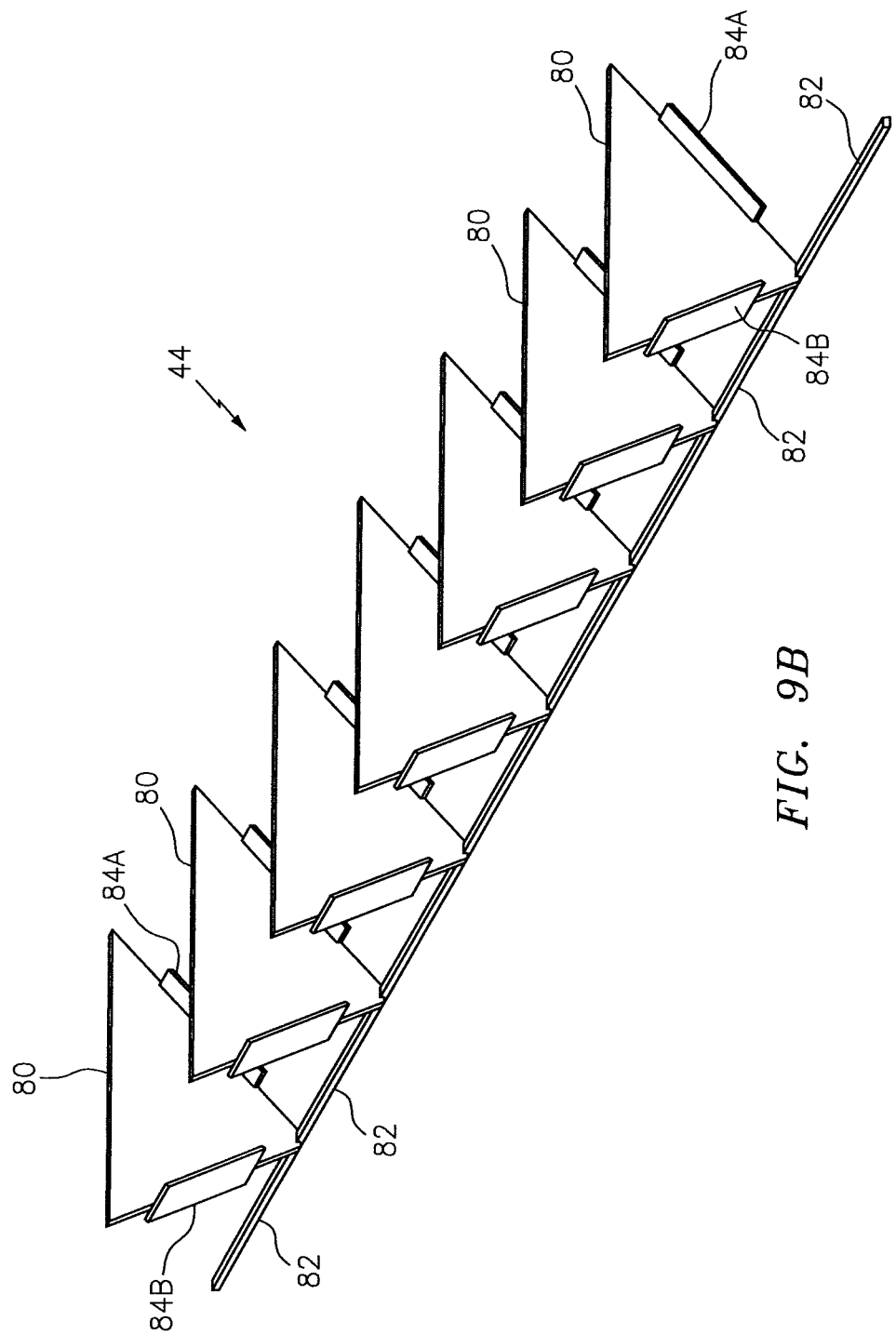
FIG. 9B is a perspective illustration of one of the stringer bodies in FIG. 9A.

Referring to FIGS. 3A and 5, each top sidewall 80 is configured with a shape that substantially matches a cross-sectional shape of a respective one of the top channels 76; e.g., see FIG. 4. Each top sidewall 80 is disposed within a respective one of the top channels 76 and configured to substantially fluidly isolate longitudinally adjacent portions of that top channel 76 from one another. More particularly, the top sidewall 80 extends laterally across the top channel 76 between the respective baffle 52 and the respective septum 53. The top sidewall 80 extends vertically into the top channel 76 to its bottom end and a respective top peak extension 54. The top sidewall 80 may also be attached (e.g., adhered and/or otherwise bonded) to one or more of the corrugated body portions 52, 53. This attachment may be a direct attachment as shown in FIG. 3A, or through one or more intermediate members such as one or more of the flanges 84A and 84B as shown in FIG. 9A (see also FIG. 9B). The flanges 84A are attached to the respective baffle 52. The flanges 84B are attached to the respective septum 53.

Figure 10:
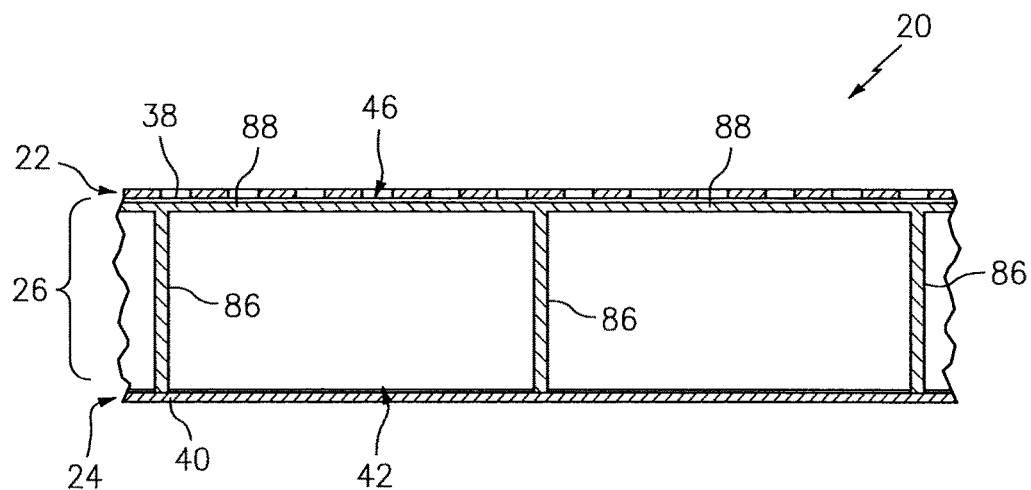
FIG. 10 is a sectional schematic illustration of another portion of the acoustic panel taken along line 5-5 in FIG. 3A.

Referring to FIG. 3A, each of the bottom stringer bodies 46 is arranged with a respective one of the bottom channels 78 and laterally between a respective laterally adjacent pair of the corrugations 48. Referring to FIGS. 3A and 10, each bottom stringer body 46 extends longitudinally along and within the respective bottom channel 78. Each bottom stringer body 46, for example, includes a plurality of bottom sidewalls 86 arranged in a longitudinally extending array. Each bottom stringer body 46 also include one or more bottom inter-sidewall bridges 88; see also FIG. 8.

Referring to FIGS. 3A, 8 and 10, each of the bottom inter-sidewall bridges 88 extends laterally between a respective longitudinally adjacent pair of the bottom sidewalls 86. More particularly, each inter-sidewall bridge 88 is connected to top ends (e.g., peaks) of the adjacent bottom sidewalls 86. With this arrangement, each inter-sidewall bridge 88 extends along and is adjacent to an interface (e.g., the top peak extension 54) between the baffle 52 and the septum 53 of a respective corrugation 48. This inter-sidewall bridge 88 may also be attached to (e.g., adhered and/or otherwise bonded to) the top peak extension 54.

Referring to FIGS. 3A and 10, each bottom sidewall 86 is configured with a shape that substantially matches a cross-sectional shape of a respective one of the bottom channels 78; e.g., see FIG. 4. Each bottom sidewall 86 is disposed within a respective one of the bottom channels 78 and configured to substantially fluidly isolate longitudinally adjacent portions of that bottom channel 78 from one another. More particularly, the bottom sidewall 86 extends laterally across the bottom channel 78 between respective baffle 52 and a respective septum 53. The bottom sidewall 86 extends vertically into the bottom channel 78 to its top end and a respective bottom peak extension 55. The bottom sidewall 86 may also be attached (e.g., adhered and/or otherwise bonded) to one or more of the corrugated body portions 52 and 53. This attachment may be a direct attachment as shown in FIG. 3A, or through one or more intermediate members such as one or more of the flanges, for example, as described above.

Figure 7:
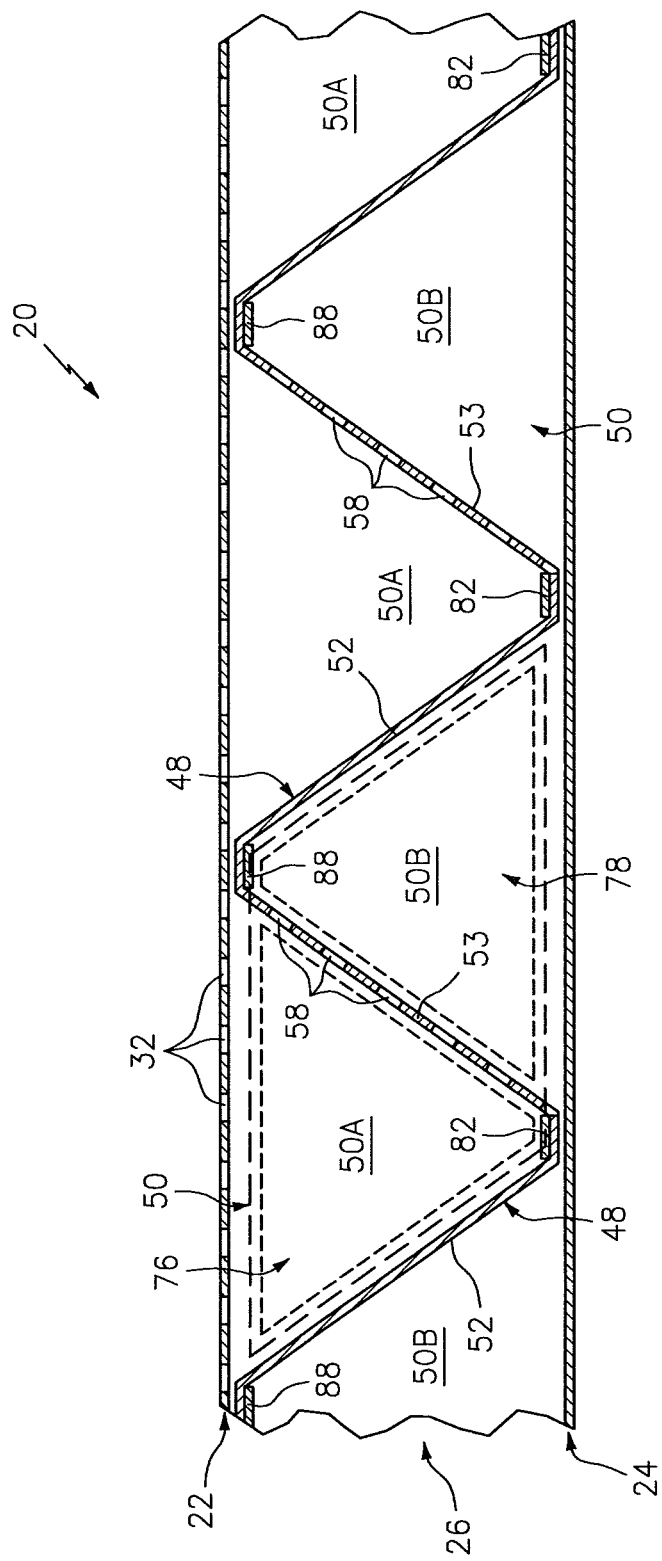
FIG. 7 is another sectional schematic illustration of the portion of the acoustic panel of FIG. 4.

Referring to FIG. 7, each of the cavities 50 extends laterally between and is formed by a laterally adjacent pair of the baffles 52. Each of the cavities 50 extends vertically between the top skin 22 and the bottom skin 24. Each of the cavities 50 extends longitudinally between a laterally adjacent pair of the top sidewalls 80 (see FIG. 5) and a laterally adjacent pair of the bottom sidewalls 86 (see FIG. 10). Referring again to FIG. 7, each septum 53 is disposed within and divides a respective one of the cavities 50 into fluidly coupled sub-cavities 50A and 50B; see also FIGS. 5 and 10. More particularly, the perforations 58 in the septum 53 fluidly couple the sub-cavities 50A and 50B together. The top sub-cavity 50A corresponds to the portion of a respective one of the top channels 76 between the adjacent top sidewalls 80; see also FIGS. 3A and 6. The bottom sub-cavity 50B corresponds to the portion of a respective one of the bottom channels 78 between the adjacent bottom sidewalls 86; see also FIGS. 3A and 6.

Each of the cavities 50 forms a resonance chamber. A length of the resonance chamber extends diagonally between the top skin 22 and the bottom skin 24 and through a respective one of the septums 53. The length of the resonance chamber therefore is longer than the vertical thickness of the cellular core 26. This enables noise attenuation of relatively low frequency noise without increasing the vertical thickness of the core and, thus, a vertical thickness of the acoustic panel 20. For example, each resonance chamber may receive acoustic waves through the perforations 32 in the top skin 22. The resonance chamber may reverse the phase of one or more frequencies of those sound waves using known acoustic reflection principles and subsequently direct the reverse phase sound waves out of the acoustic panel 20 through the perforations 32 to destructively interfere with other incoming acoustic waves.

The corrugated body 42 may be constructed from any suitable material(s). The corrugated body 42, for example, may be constructed from a metal, a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. The corrugated body 42 may be constructed from the same material(s) as the top skin 22 and/or the bottom skin 24, or a different material or materials.

The top stringer bodies 44 and the bottom stringer bodies 46 may be constructed from any suitable material(s). The stringer body 44, 46, for example, may be constructed from a metal (e.g., sheet metal), a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. One or more of the stringer bodies 44, 46 may be constructed from the same material(s) as the corrugated body 42, the top skin 22 and/or the bottom skin 24, or a different material or materials. For example, the corrugated body 42 may be constructed from composite material whereas the stringer bodies 44, 46 may be constricted from the same type of composite material, a different type of composite material, polymer material or metal (e.g., stamped and/or folded sheet metal).

In some embodiments, the stringer bodies 44, 46 may be configured such that the sidewalls 80, 86 are substantially perpendicular to the top skin 22 and/or the bottom skin 24; e.g., the sidewalls 80, 86 may be substantially vertical. However, in other embodiments, one or more of the stringer bodies 44, 46 may be configured such that the sidewalls 80, 86 are (e.g., acutely or obtusely) angled relative to the top skin 22 and/or the bottom skin 24.

Figure 11:
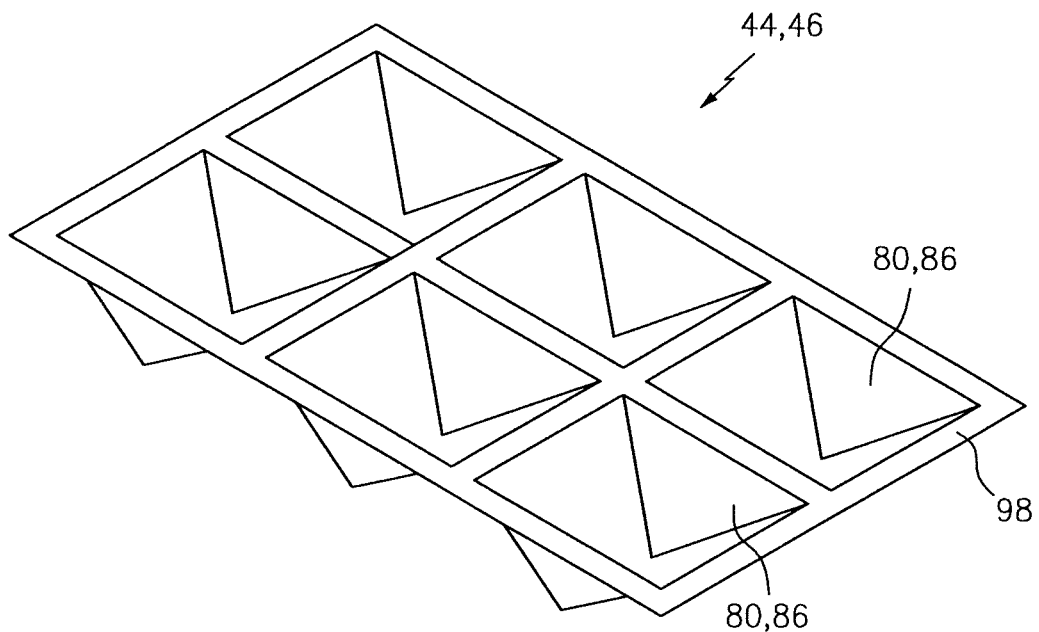
FIG. 11 is a perspective illustration of another stringer body.
Figure 13:
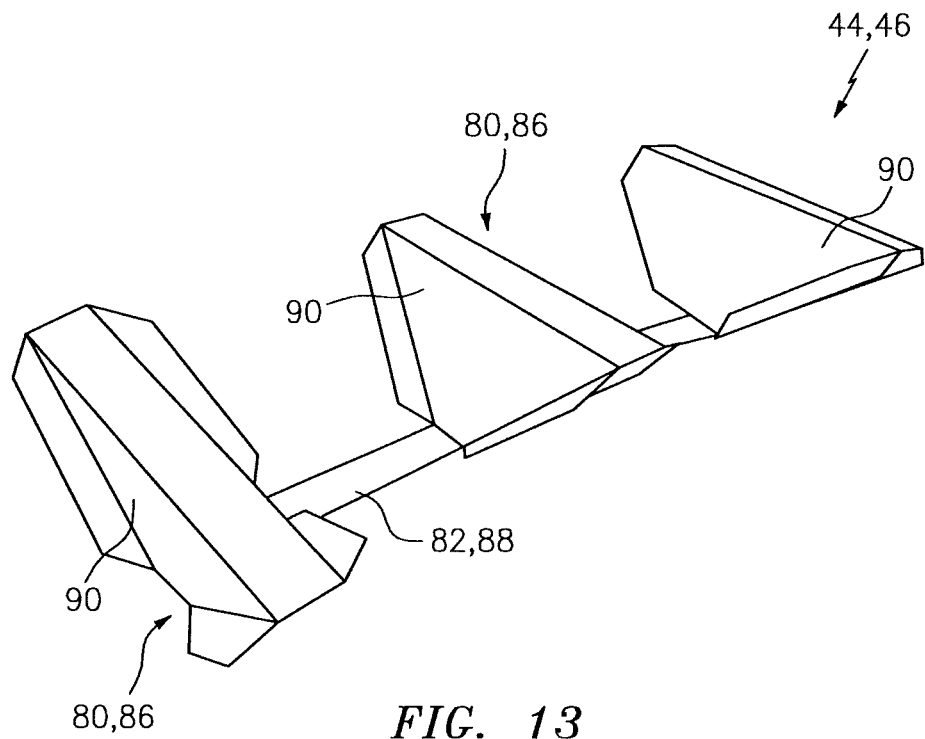
FIG. 13 is a perspective illustration of another stringer body.
Figure 14:
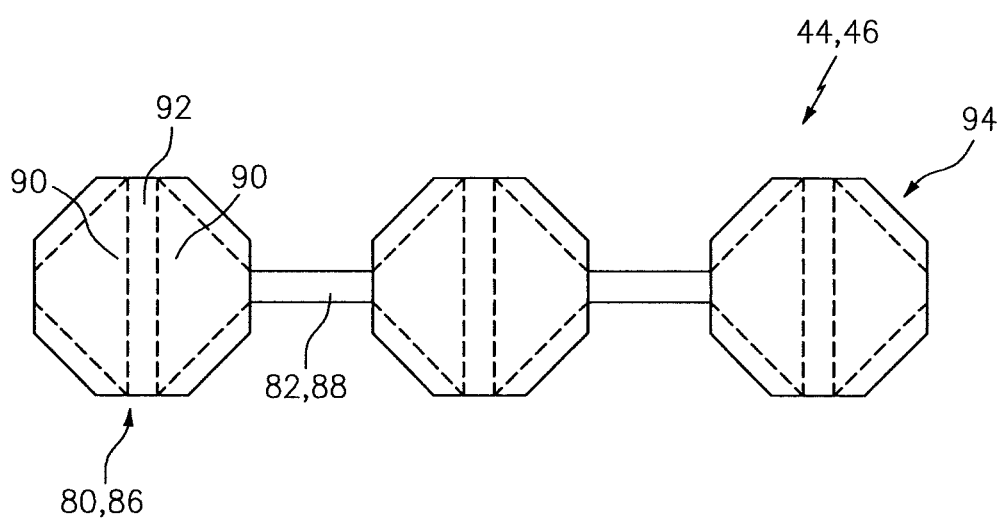
FIG. 14 is a plan view illustration of a blank for forming the stringer body of FIG. 13.

In some embodiments, each sidewall 80, 86 may have a single wall structure as shown in FIGS. 8 and 11. In other embodiments, each sidewall 80, 86 may have a multi-wall (e.g., double wall) structure as shown in FIG. 13. Each sidewall 80, 86 of FIG. 13, in particular, includes a pair of sidewall panels 90 and an intra-sidewall bridge 92. This intra-sidewall bridge 92 extends longitudinally between and connects the sidewall panels 90 together. The intra-sidewall bridge 92 may also be attached (e.g., adhered and/or otherwise bonded) to a respective skin 22, 24 (not shown). However, in other embodiments, the intra-sidewall bridge 92 may be omitted and the sidewall panels 90 may be directly connected to each other. Referring again to FIG. 13, each sidewall panel 90 extends vertically between the intra-sidewall bridge 92 and a respective one of the inter-sidewall bridges 82, 88. This configuration enables the stringer body 44, 46 to be formed from a cut and folded piece of sheet metal. For example, a piece of sheet metal may be cut to provide a blank 94 as shown in FIG. 14. This blank 94 may then be folded along the fold lines (see dashed lines) to provide a stringer body as shown in FIG. 13. However, such a stringer body configuration is not limited to such an exemplary sheet metal construction. For example, in other embodiment, the stringer body may be injection molded and/or otherwise formed using other molding techniques, etc.

Figure 12:
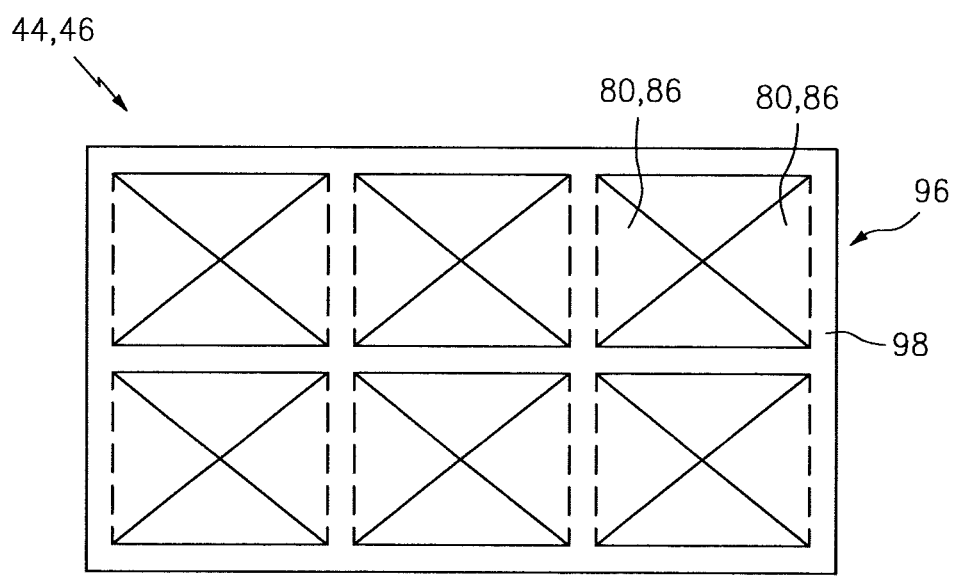
FIG. 12 is a plan view illustration of a blank for fainting the stringer body of FIG. 11.

Each stringer body 44, 46 may be solely mated with a single one of the channels 76, 78 as generally shown in FIG. 3A. However, in other embodiments, a single stringer body 44, 46 may be configured with a plurality of arrays of sidewalls 80, 86 as shown in FIG. 11. This enables a single stringer body 44, 46 to form one or more sub-cavities in a plurality of the channels 76, 78. This configuration also enables the stringer body 44, 46 to be formed from a cut and folded piece of sheet metal. For example, a piece of sheet metal may be cut to provide a blank 96 as shown in FIG. 12. This blank 96 may then be folded along the fold lines (see dashed lines) to provide a stringer body as shown in FIG. 11. However, such a stringer body configuration is not limited to such an exemplary sheet metal construction. With such a stringer body configuration as shown in FIG. 11, a base structure 98 of the stringer body 44, 46 is designed to be vertically between a respective skin 22, 24 and the corrugated body 42, where the sidewalls 80, 86 extend vertically into the channels 76, 78 from the base structure 98.

Figure 15:
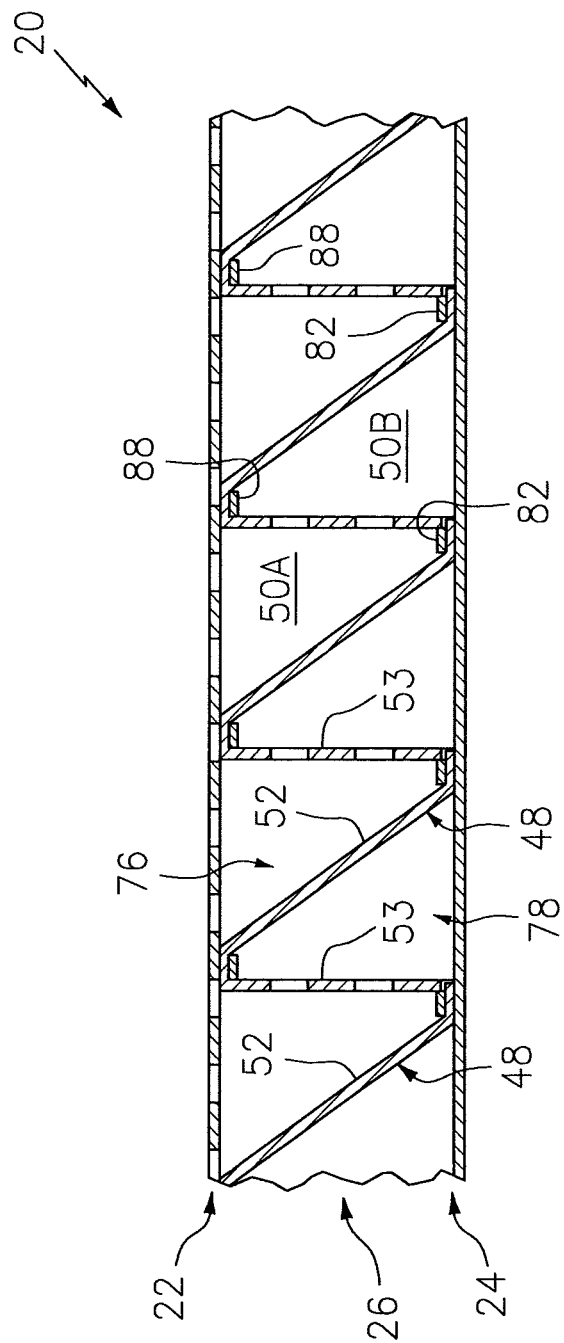
FIG. 15 is a sectional schematic illustration of a portion of another acoustic panel.

In some embodiments, both the baffles 52 and the septums 53 may be (e.g., acutely or obtusely) angled relative to the top skin 22 and/or the bottom skin 24 as shown in FIG. 4. However, in other embodiments, the baffles 52 or the septums 53 may be substantially perpendicular to the top skin 22 and/or the bottom skin 24 (e.g., substantially vertical) as shown in FIG. 15.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A panel for attenuating noise, comprising:
a porous first skin;
a second skin; and
a core connected between the porous first skin and the second skin, the core including a corrugated body and a stringer body;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between and longitudinally along a first of the baffles and a first of the porous septums; and
the stringer body including a plurality of sidewalls arranged longitudinally along the first channel, each of the sidewalls disposed within the first channel and configured to fluidly isolate longitudinally adjacent portions of the first channel from one another;
wherein a first of the sidewalls is configured as a multi-wall structure.

2. The panel of claim 1, wherein
a second of the corrugations forms a second channel that extends laterally between and longitudinally along a second of the baffles and a second of the porous septums;
the core further includes a second stringer body including a plurality of second sidewalls arranged longitudinally along the second channel; and
each of the second sidewalls is disposed within the second channel and configured to fluidly isolate longitudinally adjacent portions of the second channel from one another.

3. The panel of claim 1, wherein
a second channel extends laterally between and longitudinally along the first of the porous septums and a second of the baffles;
the core further includes a second stringer body including a plurality of second sidewalls arranged longitudinally along the second channel; and
each of the second sidewalls is disposed within the second channel and configured to fluidly isolate longitudinally adjacent portions of the second channel from one another.

4. The panel of claim 3, wherein the first channel and the second channel are on opposing sides of the corrugated body.

5. The panel of claim 3, wherein
a cavity extends laterally between the first of the baffles and the second of the baffles and is fluidly coupled with perforations in the porous first skin;
the first of the porous septums extending from the porous first skin and the first of the baffles to the second skin and the first of the baffles, and dividing the cavity into fluidly coupled first and second sub-cavities;
the first sub-cavity extends longitudinally between a longitudinally adjacent pair of the sidewalls; and
the second sub-cavity extends longitudinally between a longitudinally adjacent pair of the second sidewalls.

6. The panel of claim 1, wherein
a second of the corrugations forms a second channel that extends laterally between and longitudinally along a second of the baffles and a second of the porous septums;
the stringer body further includes a plurality of second sidewalls arranged longitudinally along the second channel; and each of the second sidewalls is disposed within the second channel and configured to fluidly isolate longitudinally adjacent portions of the second channel from one another.

7. The panel of claim 1, wherein
the first of the sidewalls includes a pair of sidewall panels and a bridge that extends longitudinally between and connects the sidewall panels; and
each of the sidewall panels projects into the first channel to the first of the baffles and the first of the porous septums from the bridge.

8. A panel for attenuating noise, comprising:
a porous first skin;
a second skin; and
a core connected between the porous first skin and the second skin, the core including a corrugated body and a stringer body;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between and longitudinally along a first of the baffles and a first of the porous septums; and
the stringer body including a plurality of sidewalls arranged longitudinally along the first channel, each of the sidewalls disposed within the first channel and configured to fluidly isolate longitudinally adjacent portions of the first channel from one another;
wherein the stringer body further includes a tab that projects out from a first of the sidewalls and is attached to the first of the baffles or the first of the porous septums.

9. The panel of claim 1, wherein each of the sidewalls extends laterally between the first of the baffles and the first of the porous septums and vertically to the porous first skin.

10. The panel of claim 1, wherein each of the sidewalls extends laterally between the first of the baffles and the first of the porous septums and vertically to the second skin.

11. A panel for attenuating noise, comprising:
a porous first skin;
a second skin; and
a core connected between the porous first skin and the second skin, the core including a corrugated body and a stringer body;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between and longitudinally along a first of the baffles and a first of the porous septums; and
the stringer body including a plurality of sidewalls arranged longitudinally along the first channel, each of the sidewalls disposed within the first channel and configured to fluidly isolate longitudinally adjacent portions of the first channel from one another;
wherein the stringer body further includes a plurality of bridges arranged at an interface between the first of the baffles and the first of the porous septums; and
wherein each of the bridges extends longitudinally between and connects a respective longitudinally adjacent pair of the sidewalls.

12. A panel for attenuating noise, comprising:
a porous first skin;
a second skin; and
a core connected between the porous first skin and the second skin, the core including a corrugated body and a stringer body;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between and longitudinally along a first of the baffles and a first of the porous septums; and
the stringer body including a plurality of sidewalls arranged longitudinally along the first channel, each of the sidewalls disposed within the first channel and configured to fluidly isolate longitudinally adjacent portions of the first channel from one another;
wherein the stringer body further includes a base structure that interconnects the sidewalls together; and
wherein each of the sidewalls projects vertically into the first channel from the base structure.

13. The panel of claim 1, wherein the stringer body is formed from sheet metal.

14. The panel of claim 1, wherein
the corrugated structure comprises composite material; and
the stringer body comprises metal.

15. The panel of claim 1, wherein the stringer body comprises polymer.

16. The panel of claim 8, wherein the first of the sidewalls is configured as a multi-wall structure.

17. The panel of claim 11, wherein a first of the sidewalls is configured as a multi-wall structure.

18. The panel of claim 12, wherein a first of the sidewalls is configured as a multi-wall structure.

* * * * *

UNITED STATES PATENT AND TRADEMARK OFFICE
CERTIFICATE OF CORRECTION

PATENT NO. : 10,316,755 B2  
APPLICATION NO. : 15/356053  
DATED : June 11, 2019  
INVENTOR(S) : Biset et al.

Page 1 of 1

It is certified that error appears in the above-identified patent and that said Letters Patent is hereby corrected as shown below:

In the Specification

Column 2, Line 55, please delete "foil" and insert --form--

Column 3, Line 62, please delete "fainting" and insert --forming--

Signed and Sealed this
Thirtieth Day of July, 2019

Andrei Iancu
*Director of the United States Patent and Trademark Office*